J. WILKINSON.
PROCESS FOR MANUFACTURING TURBINE BUCKET WHEELS.
APPLICATION FILED MAR. 20, 1906.
1,005,736.
Patented Oct. 10, 1911.
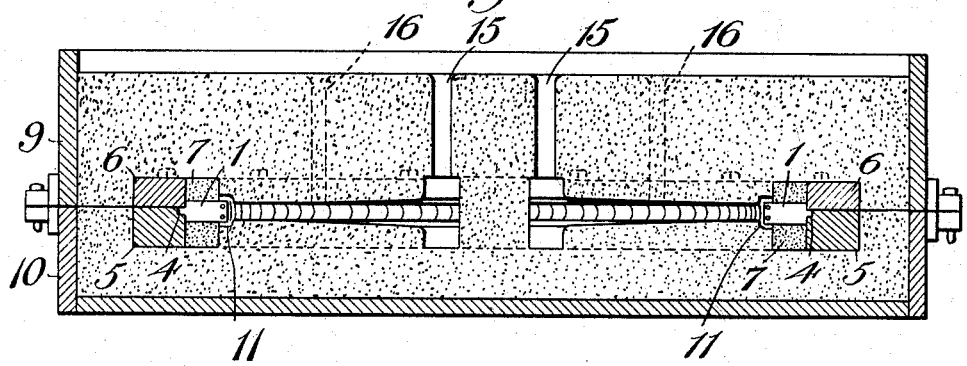
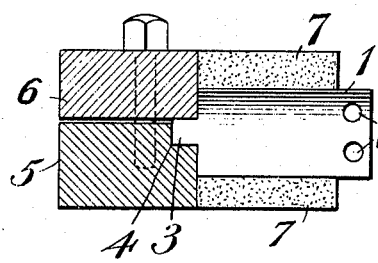
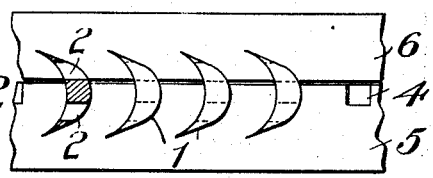
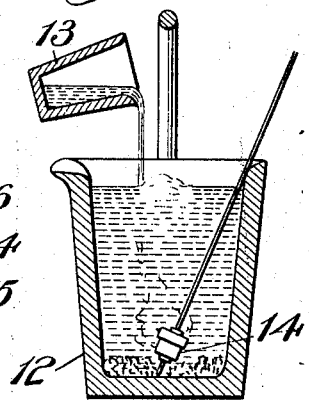
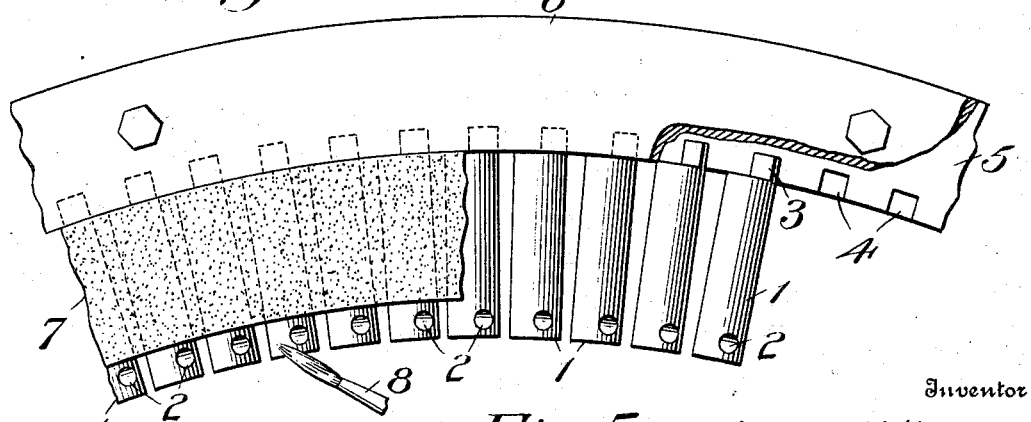
Witnesses
Edwin L Bradford
P. H. Burch
Inventor
James Wilkinson
By
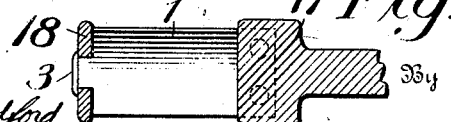
Attorney

UNITED STATES PATENT OFFICE.

JAMES WILKINSON, OF PROVIDENCE, RHODE ISLAND, ASSIGNOR, BY MESNE ASSIGNMENTS, TO GENERAL ELECTRIC COMPANY, A CORPORATION OF NEW YORK.

PROCESS FOR MANUFACTURING TURBINE BUCKET-WHEELS.

1,005,736.     Specification of Letters Patent.     Patented Oct. 10, 1911.

Application filed March 20, 1906. Serial No. 307,089.

*To all whom it may concern:*

Be it known that I, JAMES WILKINSON, a citizen of the United States, residing at Providence, in the county of Providence and State of Rhode Island, have invented new and useful Improvements in Processes for Manufacturing Turbine Bucket-Wheels, of which the following is a specification.

My invention relates to an improved process for manufacturing bucket wheels for elastic fluid turbines, its object being to eliminate the labor and cost of fitting or joining the buckets or vanes to the wheel blank. I propose to cast a disk wheel around the drilled or notched inner ends of a ring of buckets and afterward to finish the wheel after the buckets have been thus joined thereto.

In practice, I provide positive means to hold the ring of buckets firmly in position after which I ram sand around the buckets forming a bucket mold from which the inner ends of the buckets project. The bucket mold, after being packed, is then placed in the wheel mold and molten metal, treated to make it highly fluid, is introduced, suitable risers being provided to retard cooling of metal at the rim and to avoid shrink strains. The buckets may have their inner ends perforated or otherwise prepared to cause them to be firmly rooted in the wheel rim independent of any welding effect, and, where the nature of the metals used requires it, these ends will be coated with a flux.

As the preferred means for inducing a super-fluid condition of the molten metal in the ladle, I use what is commonly known as the thermit process. This process produces a very rapid and violent reaction in the body of molten metal, serving to materially increase its fluidity without greatly raising its temperature. In this highly fluid state the metal will flow readily and rapidly throughout the mold, filling the latter uniformly and flowing around the exposed bucket ends so as to join the buckets with great strength and rigidity to the wheel at the time it is cast. By this means I avoid having to fit or join the buckets to the wheel, and it may be finally finished and balanced in one operation.

My invention further comprises the provision of stems or projections at the outer ends of the buckets which are squared or otherwise shaped for a fixed engagement in the notches of a two part clamping ring. After the wheel has been machined up true, the buckets may be banded with a perforated shroud or band, the stems projecting through the perforations and riveted over to serve as a holding means.

My invention further comprises the improvements in the process for manufacturing wheels hereinafter more particularly described, in which:—

Figure 1, is a vertical sectional view through a completed mold ready for casting the wheel blank to the buckets. Fig. 2, is an enlarged cross-sectional view of the bucket core and clamping ring. Fig. 3, is a partial plan view of the bucket core with the sand and upper ring partly broken away. Fig. 4, is an inside view of a section of the clamping ring with the buckets in position therein. Fig. 5, illustrates a section through the rim of a completed wheel. Fig. 6, illustrates the thermit process for treating the metal before pouring it into the mold.

Similar reference numerals refer to similar parts throughout the drawings.

In carrying my improved process for manufacturing bucket wheels into effect, I first provide the requisite number of buckets 1, which are preferably of nickel steel cut from a strip of the desired cross-sectional contour and provided at their inner ends with one or more holes 2, drilled or punched therethrough, and at their outer ends with integral projecting stems 3 having flat sides. A set of these buckets have their stems 3 inserted in the notches 4 of a ring 5, the stems making a close fit in the notches, which, being properly spaced, serve to space and secure the buckets in proper alinement. A second ring 6 is bolted to ring 5 and clamps the buckets in position, after which sand is packed around the buckets by any suitable means or tools, the punched ends of the buckets projecting inwardly clear of the sand mold 7. The whole is then placed in a core oven and baked, after which it is removed and the inwardly projecting ends of the buckets are cleaned and covered with a fluxing composition to insure a free flow of metal around the bucket surface. As illustrated in Fig. 3, this flux, which is preferably a solution of liquid glass, is applied with a brush 8, or the ends may be "tinned"

with any suitable metal. The wheel mold is then prepared by providing a cope 9 and drag 10 in which the sand is pressed around the pattern of the wheel blank or the mold may be formed by a sweep, allowance being made for the reception of the clamping ring and bucket mold. When the drag is ready, the bucket mold is placed in position with the inner ends of the buckets projecting into the annular rim chamber 11 of the wheel mold. The cope is then secured in place and the mold is complete and ready for the casting of the wheel.

If the liquid semi-steel or cast iron at ordinary molten temperature were used to cast the wheel, the metal would not remain sufficiently fluid throughout the mold to properly unite all the buckets unless a very large rim chamber 11 were provided, which would have to be cut away at a loss in finishing the wheel, or unless a large volume of the molten metal were caused to flow through the mold to insure uniform fluidity in the rim chamber. This latter process is wasteful and uniform circulation uncertain. To provide an uniform circulation of molten metal of the desired fluidity to insure the buckets being all properly heated and united with the resulting wheel rim and to avoid premature chilling of the molten metal, I prepare the metal in the following manner. I place in a foundry ladle 12 a predetermined percentage of steel chips or filings, then fill the ladle with the required amount of molten cast iron and add any desired amount of molten nickel produced preferably by the thermit process in a ladle 13. After adding the nickel, a titanium thermit cartridge 14 is held under the surface of the fluid in ladle 12 and the resulting reaction of the thermit thoroughly dissolves the steel chips and distributes the steel and nickel evenly throughout the metal in the ladle. At the same time the fluidity of the ladle contents is greatly increased with but little increase of temperature. This highly fluid metal is now poured into the mold through the runners 15 and flows freely distributing itself evenly in the rim chamber 11 and flowing around the bucket ends and through their perforations. Any desired number of risers 16 may be provided around the rim chamber or elsewhere to prevent initial cooling of metal at the rim and also to avoid shrink strains or piping. Also thermit may be introduced in these risers to start a further reaction and keep the metal liquid.

After the wheel 17 has cooled, it is removed from the mold and machined after which the buckets may be connected to a shroud or band 18 having perforations through which the bucket stems 3 pass and are riveted over as seen in Fig. 5.

The nickel is used to give toughness and anti-corrosive properties to the casting while the steel imparts the desired strength. It will be understood, however, that I am not limited to any particular character of metal for casting, and that the metal used may be brought to a high state of fluidity by the use of thermit or similar reactive chemicals or compositions.

Without limitation therefor to the detailed steps of the foregoing process which are given as illustrating the preferred manner of carrying my invention into effect, what I claim as new and desire to secure by Letters Patent, is:—

1. An improved process for manufacturing turbine members, such as wheels, having buckets attached to the body portions of said members by a cast joint, which consists in forming a mold for casting the body, said mold having buckets so mounted therein that the ends to be united to the body project into the space in the mold which receives the metal, preparing a quantity of molten metal, increasing the fluidity of the molten metal by introducing a quantity of thermit or the like into said metal, and then pouring this fluid metal into the mold where it surrounds the projecting ends of the buckets.

2. An improved process for manufacturing turbine wheels in the form of relatively thin disks carrying a rim to which metal buckets are secured by a cast joint, which consists in forming a mold for casting the wheel, said mold having buckets mounted therein with the ends to be united to the wheel projecting into the rim chamber in the mold, placing a quantity of solid metal in a suitable receptacle, preparing molten metal and pouring it on the metal in the receptacle, introducing a titanium thermit cartridge into the mass of metal in the receptacle to melt the solid metal and increase the fluidity of the contents of the receptacle, and then pouring the extra-fluid metal into the mold where it surrounds the projecting ends of the buckets.

In testimony whereof I have hereunto set my hand in presence of two subscribing witnesses.

JAMES WILKINSON.

Witnesses:
  Geo. H. Capron,
  Henry J. Stiles.